United States Patent [19]

Glogowski

[11] Patent Number: 4,689,749
[45] Date of Patent: Aug. 25, 1987

[54] AUTOMATIC TACK-OFF MACHINE

[75] Inventor: Stefan W. Glogowski, Detroit, Mich.

[73] Assignee: Omni Engineering, Troy, Mich.

[21] Appl. No.: 702,050

[22] Filed: Feb. 15, 1985

[51] Int. Cl.⁴ .......................... G06F 15/46; B60S 3/06
[52] U.S. Cl. ................................. 364/468; 15/53 AB; 364/400
[58] Field of Search ............... 364/468, 474, 478, 469, 364/400, 424; 410/52, 4; 15/53 R, 54, 53 A, 53 AB, DIG. 2; 134/123, 122 R, 45

[56] References Cited

U.S. PATENT DOCUMENTS

| | | | |
|---|---|---|---|
| 3,391,700 | 7/1962 | Lawter | 15/53 R |
| 3,594,843 | 7/1971 | Sesia et al. | 15/53 A |
| 4,330,212 | 5/1982 | Sekine et al. | 364/468 |
| 4,495,667 | 1/1985 | Roncaglione et al. | 15/53 A |
| 4,521,627 | 5/1986 | Vereen | 364/474 |

Primary Examiner—Joseph Ruggiero
Attorney, Agent, or Firm—Barnes, Kisselle, Raisch, Choate, Whittemore & Hulbert

[57] ABSTRACT

A tack-off machine for automatically removing dust and the like from a series of vehicle bodies of different styles being moved by a conveyor through the machine to clean them for priming or painting. At least one rotary top brush automatically follows the profile or contour of each vehicle body to remove dust from at least the front, any hood and the roof of the body and preferably also any rear deck and the back of the body. To insure cleaning of the front of the body the top brush moves along a path sloping generally upward and in the direction of travel of the body. Movement of the top brush is controlled by a central processing unit in accordance with a profile of the body and in synchronization with the speed at which the body is moved through the machine by the conveyor.

28 Claims, 7 Drawing Figures

AUTOMATIC TACK-OFF MACHINE

FIELD

This invention relates to the cleaning of surfaces of vehicle bodies to prepare them for painting and more particularly to tack-off machines for automatically removing dust, lint and other particulate contaminants from the surfaces of a vehicle body prior to priming or painting the surfaces.

BACKGROUND

To obtain quality painting of exterior surfaces of a vehicle body, dust, lint and other particulate contaminants must be removed from the body surfaces just prior to painting these surfaces. Previously, dust, lint and other particles have been removed by machines with various brushes and manually wiping with a tacky cloth the portions of the body missed by the brushes or by manually wiping the entire body with tacky cloths. These prior approaches are costly, not uniform and typically leave a significant amount of dust on the body.

SUMMARY

A dust removal or tack-off machine with rotary side brushes and at least one rotary top brush which automatically follows the profile of the vehicle body as it moves past the brush to remove dust and other particulate contaminants from the front, any hood, roof, any rear deck and back of the vehicle body. To insure removal of dust from the front surfaces, the axis of the top brush moves along a path sloping generally upwardly and in the direction of travel of the vehicle body through the machine. To facilitate the removal of dust from vehicles with different profiles, the movement of at least the top brush is varied and controlled by an automatic control system responsive to the different profiles of various styles of bodies and the speed at which they are moved through the machine.

Preferably, to avoid a collision of a vehicle body with the top brush, when an imminent collision is detected the top brush is rapidly moved away from the body. To avoid damage if a collision occurs, the top brush is carried by pivoted arms which preferably are counterweighted and driven through a clutch to rapidly release and move the top brush assembly away from the body. To facilitate and insure essentially complete removal of all dust and particulate contaminants, a stream of ionized air is directed onto each brush to neutralize any electrostatic charge on the feathers or bristles of the brush so that the dust and other particles can be swept from the surface and carried away by an exhaust system.

Objects, features and advantages of this invention are to provide a machine which automatically removes essentially all dust and particulate contaminants from all of the exterior surfaces of a vehicle body which are to be primed or painted, eliminates all manual wiping of the body surfaces, can be utilized with a wide range of vehicle body profiles, can remove dust from a succession of vehicle bodies having different profiles, is rugged, durable, dependable, and of economical manufacture, assembly, and operation, requires little service and maintenance and has a long service life.

These and other objects, features and advantages of this invention will be apparent from following detailed description, appended claims and accompanying drawings in which:

DETAILED DESCRIPTION

Figure 1:
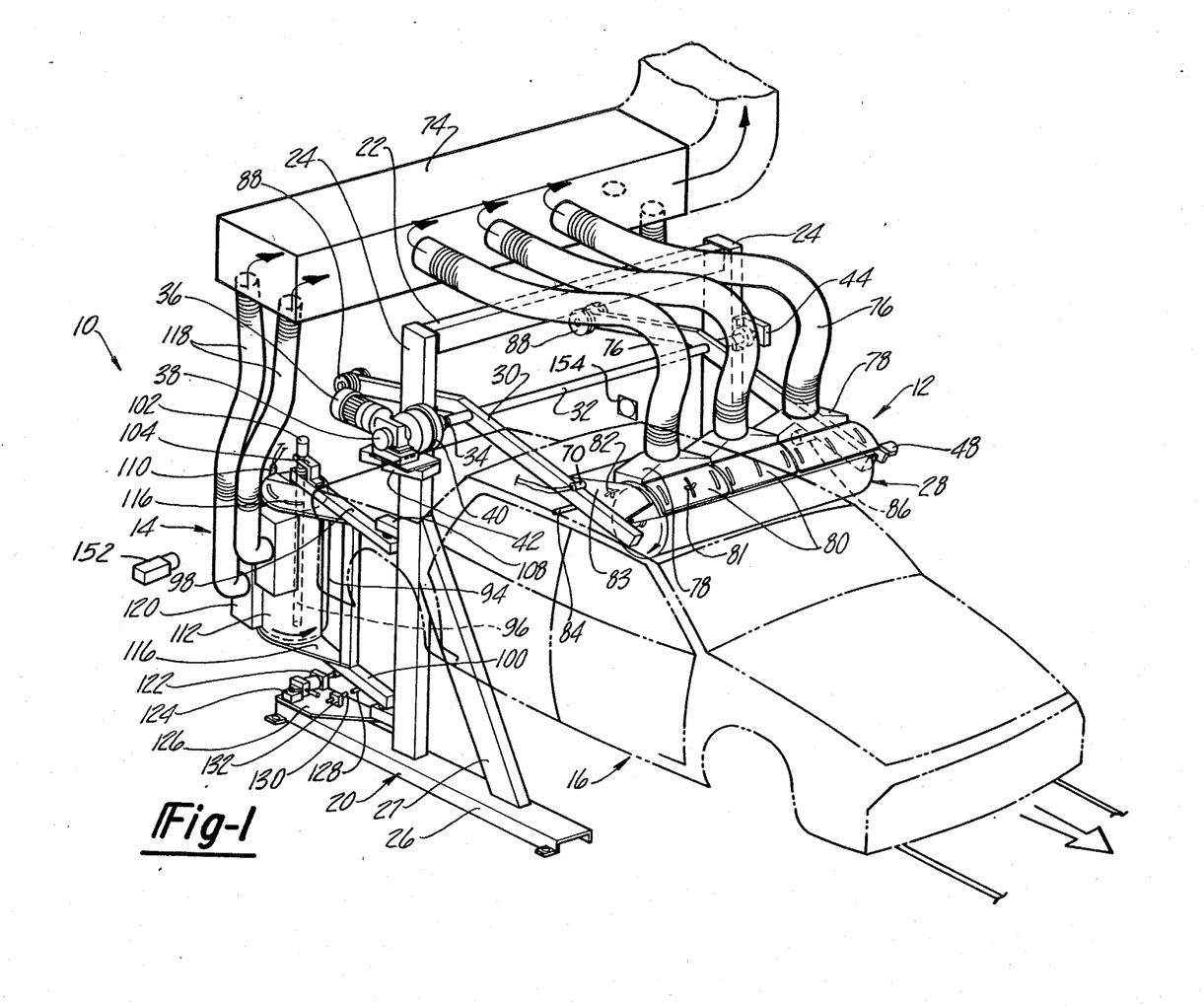
FIG. 1 is a perspective view of a tack-off machine embodying this invention and having one top rotary brush.
Figure 2:
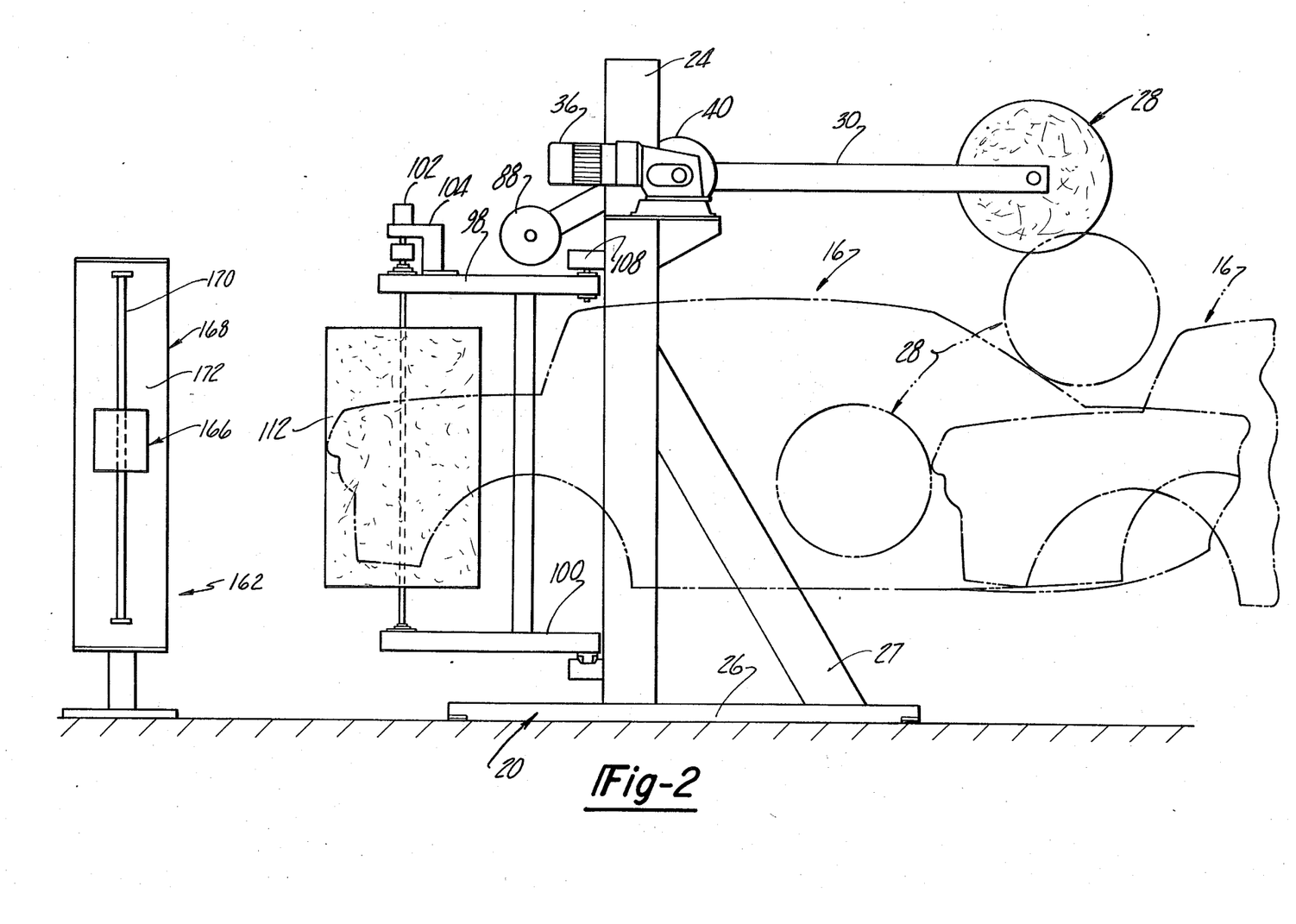
FIG. 2 is a side view of the machine of FIG. 1.

Referring in more detail to the drawings, FIGS. 1 and 2 illustrate a dust removal or tack-off machine 10 embodying this invention having a top brush assembly 12, and a pair of side brush assemblies 14 (only one of which is shown) for removing particulate contaminants such as dust from exterior surfaces to be primed or painted of a vehicle body 16 moved through the machine by a conveyor 18. The brush assemblies are carried by a gantry frame 20 with a cross beam 22 fixed to a pair of spaced apart uprights 24, each secured to a base 26 and supported by a cross brace 27.

In accordance with one feature of this invention, the top brush assembly 12 can remove dust from the front and back, as well as the top, of a vehicle body. To insure the brush assembly 12 can remove dust from the front of the moving vehicle body, a rotary brush 28 is movable along a path inclined generally upwardly and in the direction of travel of the vehicle body at an obtuse included angle to the path of travel of the vehicle body as it approaches the brush. The rotary brush is carried by a pair of pivot arms 30 fixed to a drive shaft 32 journalled in bearings 34 located vertically higher than the point where the brush contacts the vehicle body. To further insure the brush will engage the front of the body, preferably the arms have a substantial length between the shaft 32 and the axis of the brush of about $4\frac{1}{2}$ feet and the shaft is located about $5\frac{1}{2}$ feet above the bottom of the body.

The arms are driven by a reversible motor 36 through a gear box 38 and a magnetic clutch 40 to move the brush to follow the profile of the vehicle as it passes through the machine. The bearings are secured to the uprights 24 and the clutch and gear box are mounted on a support bracket 42 fixed to an upright. The angular position of the drive shaft 32 and hence the position of the brush assembly is sensed and translated into an electric signal by a position sensor or encoder 44 coupled to the drive shaft 32 and mounted on the other upright 24. The rotary brush 28 is driven by a motor 48 mounted on one of the arms.

Figure 3:
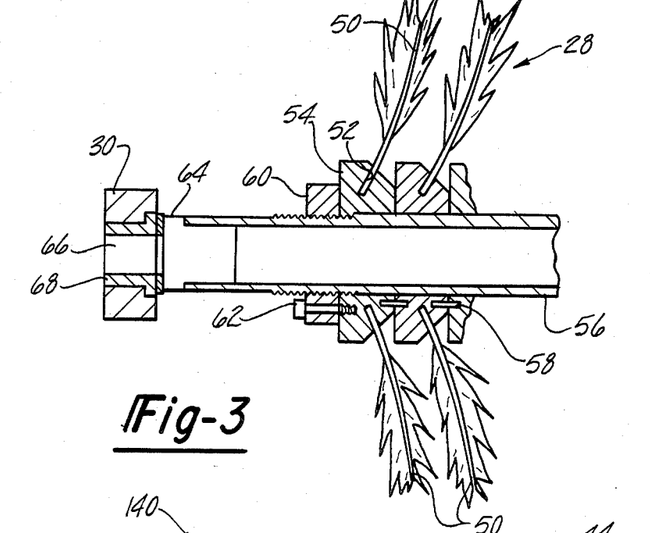
FIG. 3 is a fragmentary sectional view of the top rotary brush of the machine of FIG. 1.

As shown in FIG. 3, preferably the flexible bristles or wipers of the brush 28 are ostrich feathers 50 secured in circumferentially spaced holes 52 in hubs 54 received on a driven tubular shaft 56. Although ostrich feathers are preferred, bristles of other soft and pliable material, particularly synthetic resins, can be used. Preferably the brush 38 has a diameter of about 2 feet and a length of about 6 feet. The hubs are drivingly connected together by pins 58 and to the shaft 56 by spaced apart collars 60, each threaded onto the shaft adjacent one end and secured to an immediately adjacent hub by a cap screw 62. Use of separate hubs facilitates replacement of worn, damaged or missing feathers 50, and if desired, the forming of a contour in the brush by varying the length of the feathers in some of the hubs. A plug 64 is fixed to one end of the tube shaft 56 and has a stub shaft 66 journalled in a bushing 68 received in one arm. The other end of the tube shaft 56 is similarly journalled in the other arm by a plug having a stub shaft connected to the drive shaft of the motor 48.

In accordance with another feature of this invention, to insure removal of essentially all dust and other particles from the vehicle body, all electrostatically charged particles are neutralized so they can be swept up and evacuated. Due to grounding, the vehicle body and the particles on it are usually uncharged or electrically neutral. However, movement of air over the brush and rotation of the brush itself inside the hood creates an electrostatic charge on the feathers or bristles of the brush. Unless neutralized, this charge can be transferred to the particles which would inhibit their removal from the vehicle body. To insure electrically neutral particles, a stream of ionized air is directed onto the brush 28 by an ionizing bar 70 received in and extending across the leading edge of an exhaust hood 72 which overlies a portion of the brush. Preferably the ionizing bar has a plurality of longitudinally spaced outlets through which compressed air is discharged. A suitable ionizing bar is commercially available from Simco Company of 2257 North Penn. Rd., Hatfield, Pa. 19440 as a type MEA 100 shockless ionizing bar. Preferably, a Simco Model D-167-RX input power supply is used with this ionizing bar.

The exhaust hood 72 is connected to a duct 74 of an exhaust system (not shown) by flexible hoses 76, each connected to an outlet 78 with an adjustable damper plate 80 secured in an adjusted position by wing nuts 81. If desired, the exhaust duct can be supported on the cross rail 22 of the frame. To facilitate proper angular orientation of the exhaust hood with respect to the surface of the vehicle, its ends are secured in adjusted position by bolts and wing nuts 82 received in slots in carrier plates 83 fixed to the arms 30.

In accordance with another feature of this invention, the brush assembly 12 and its drive are constructed and arranged to prevent damage or injury to both the brush assembly and the vehicle body in the event they crash or collide. The brush assembly is constructed so that it can pivot upwardly out of the way of the body in the event of a collision. To permit it to do so, the drive motor 36 and gear box 38 are coupled to the drive shaft 32 by the magnetic clutch 40. This clutch provides both a limited torque transmission or slip coupling and a quick disconnect from the drive. If a collision is imminent, the clutch is disengaged to permit the brush assembly to move rapidly upward by suitable control circuitry in response to a signal from a photoelectric cell or switch 84 mounted on the arm 30 and aligned with a reflective target 86 mounted on the other arm. The switch 84 changes state in response to the breaking of its light beam by the vehicle body when a collision is imminent. Preferably, to urge the brush assembly 12 to rapidly swing upward out of the way of the vehicle body, weights 88 are attached to other ends of the arms 30. The weights have sufficient mass to rotate the brush assembly counterclockwise (as viewed in FIG. 1) when the clutch 40 is disengaged.

Since the two side brush assemblies 14 are mirror images of each other only one will be described in detail. Each side brush assembly has a brush 94 on a shaft 96 journalled adjacent its ends in bearings received in upper and lower pivot arms 98 and 100. Each brush is driven by a motor 102 coupled to the shaft and mounted on a bracket 104 fixed to the upper arm. The arms are interconnected by a support 106 and pivotally connected adjacent their other ends to carrier blocks 108 fixed to an upright 24 of the frame. Ionized air is directed onto the brush by an ionizing bar 110 extending across the front of an exhaust hood 112. To permit proper angular orientation of the hood relative to the body side panels, the hood is secured in adjusted position by bolts and wing nuts 114 received in slots in carrier plates 116 fixed to the arms 98 and 100. The hood is connected to the exhaust duct 74 by flexible hoses 118 each connected to an outlet 120, which preferably has adjustable damper plates (not shown). Preferably, the general construction and arrangement of the brush, exhaust hood, and ionizing bar of each side brush assembly is essentially the same as that of the top brush assembly 12.

Each side brush assembly 14 can be advanced so that its brush can contact side panels of the vehicle body and retracted so that its brush will disengage and clear a vehicle body. Each brush assembly is advanced and retracted by a pneumatic cylinder 122 with its piston rod pivotally connected to the lower arm 100 and its body pivotally connected to a mounting block 124 secured to a carrier plate 126 fixed to the bottom of the lower mounting block 108. The extent to which the side brush assembly can be retracted is limited by engagement of a stop 128 fixed to the lower arm 100 with an adjustable bumper 130 threaded in a block 132 fixed to the plate 126.

The tack-off machine usually cleans more than one vehicle body style or body shape in longitudinal section. Thus, the style or shape of each body entering the machine must be determined and the top brush assembly moved along a different path for each body style or shape. The determination of the body style or shape and positioning and movement of the top brush 28 to engage and clean the front, any hood, roof, any rear deck and back of each vehicle body passing through the machine is done by an automatic control system.

Figure 4:
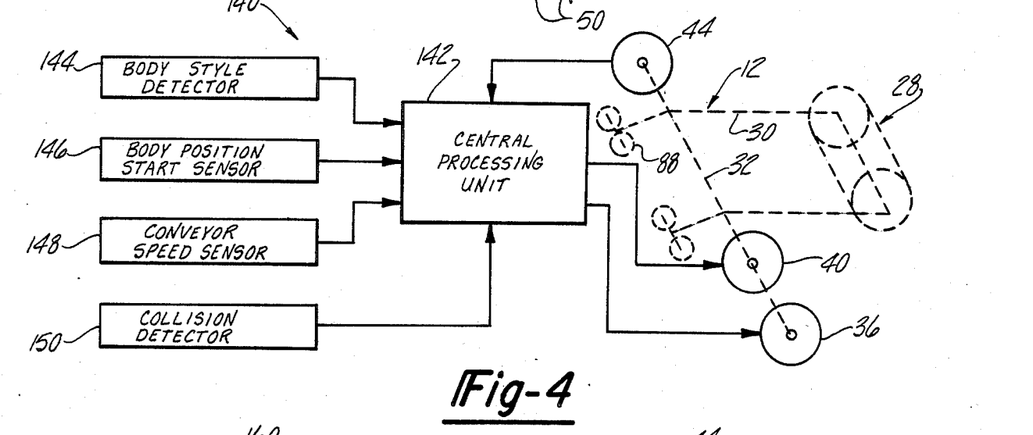
FIG. 4 is a block diagram of a control system for the machine of FIG. 1.

A suitable control system 140 which detects the style of each body and uses a predetermined profile for each body style to position and control the brush assembly is shown in the block diagram of FIG. 4. This system has an electronic programmable controller, microcomputer with a suitable program, or central processing unit 142. For each body style, the necessary path of travel of the top brush assembly is predetermined and then programmed into a programmable memory of the central processing unit.

As indicated in FIG. 4, the central processing unit 142 utilizes a signal from a body style detector 144 to select the particular predetermined path of travel to be used for each body as it passes through the machine. The processing unit initiates movement of the top brush assembly 12 in accordance with the selected path of travel in response to a start signal from a body position sensor 146. This movement of the brush assembly in accordance with the selected path of travel is also synchronized by the central processing unit with the speed or rate of movement by the conveyor of the body through the machine by the central processing unit in response to a signal from a conveyor speed sensor 148. The position of the brush assembly 12 is indicated by a signal from the position sensor 44. In response to all of these signals, the central processing unit drives the motor 36 through a servo loop including the sensor 44 to move the brush assembly 12 so that it will clean the surfaces of the body as it passes through the machine.

A suitable programmable controller 142 is commercially available from Allen-Bradley Co., System Div., 747 Alpha Drive, Highland Heights, Ohio 44113 as Model PLC 2/30. A suitable sensor 44 is also available from Allen Bradley as Model AB-845-C-SAZ-3E6-2AK3.

The tack-off machine is usually used with a body priming or painting line which processes only a few body styles for any given model year. Thus, in most installations, a relatively simple body style detector 144 utilizing photoelectric cells is satisfactory. For example, where only two body styles A and B must be detected, three photoelectric cells and appropriate circuitry provide a satisfactory detector system 144. Preferably, the detector system is installed in a work station immediately preceding the tack-off machine although it can be installed in a work station containing the tack-off machine. The first photoelectric cell is located so that it will sense or change states in response to the presence of any vehicle body and the second and third photocells are located so their states will be different depending on which one of the two body styles is present.

For example, if body styles A and B have a significant difference in the width of their rear pillars or in the distance between the leading edge of their rear pillar and the front of their body, the second and third photoelectric cells can be positioned adjacent the conveyor line so that when the beam of the first cell is initially broken or blocked by the front of a vehicle, the beams of the second and third photocells are both broken or blocked by the rear pillar if it is an A body style or, the beam of the second photocell is broken while the beam of the third cell is uninterrupted by the rear pillar if it is a B body style. Through appropriate circuitry, a signal is sent by this detector system 144 to the processing unit in response to either of these sets of states of the photocells to indicate that an A body style or a B body style will next be processed by the tack-off machine. In response to this signal, the processing unit selects the appropriate predetermined profile.

To synchronize the movement of the top brush assembly with the speed at which the conveyor moves the body through the machine, the processing unit also receives an input signal from the conveyor speed sensor 148. The starting, stopping and speed of the conveyor is sensed by the sensor 148 which can be an electromagnetic encoder producing a series of pulses in response to movement of the conveyor. A suitable conveyor speed sensor is commercially available from B.E.I. of Airport Road, Cincinnati, Ohio 45226 as BEI No. H25D-75-AB 7406 SM 16.

When the front of the body reaches a predetermined position as it is being advanced by the conveyor into the machine, a signal is provided by the body position sensor 146 which causes the processing unit to start or initiate the machine cycle. A suitable sensor 146 is a photoelectric cell or switch and a reflective target 147 which changes state when its beam is interrupted or blocked by the front of the body as it is advanced into the machine. The processing unit advances the side brush assemblies so they will contact the vehicle by actuating the pneumatic cylinders 122 through appropriate electropneumatic control circuitry. The processing unit also energizes the magnetic clutch and drives the reversible motor 36 to follow the predetermined path of travel selected for the body style determined by the style detector. When the top brush has completed the movement called for by the profile, the processing unit causes the top brush assembly to be returned to the fully raised position by reversing the motor 36 and retracts the side brushes by energizing the pneumatic cylinders 122 through appropriate electropneumatic circuitry. Thereafter, the next cycle of the machine is initiated when the beam of the photoelectric body position sensor 146 is broken by the next body being moved into the machine by the conveyor.

In the event the top brush is about to collide with a body, a collision detector 150, such as the photoelectric cell 84, produces a signal which causes the processing unit to deenergize and thereby disengage the clutch 40 which allows the top brush assembly to rapidly rise and swing away from the body.

The various drive motors of the machine 10 can be electric, hydraulic or pneumatic motors. When an explosion proof machine is desired, preferably the motors are pneumatic or hydraulic.

In use, the machine 10 is typically installed in a conveyor line in a body assembly plant before and in close proximity to a primer or paint spray booth. The machine is connected to appropriate sources of electric power, compressed air, and an exhaust air handling system, which usually has filters or other means for removing particles from the air, and discharges the filtered air into either the atmosphere or the plant.

In using the machine 10, typically vehicle bodies 16 are moved one after another through the machine by the conveyor 18. As each body approaches the machine, its style is determined by the body style detector 144 which provides an appropriate signal to the processing unit 142 to select the appropriate predetermined path of travel for movement of the top brush assembly. As the body continues to be advanced, it changes the state of the body position sensor 146 which produces a signal causing the processing unit to initiate the machine cycle for this body. As this body advances, the processing unit causes the side brush assemblies 14 to advance by energizing the pneumatic cylinders 122 and the drive motors 102 so that the brushes 94 of these assemblies will remove dust from the side panels of the body. The processing unit positions the top brush assembly 12 to clean the upper surfaces of this body by energizing the magnetic clutch 40 and drive motor 36. The processing unit controls the motor 36 so that movement of the top brush is a function of the selected path of travel and inputs from the encoder 44 indicating the angular position of the top brush assembly and the conveyor speed sensor 148 indicating the rate at which this body is moved through the machine to synchronize movement of the brush with movement of this body.

These brush assemblies contact panels of the body and their associated ionizing bars direct streams of air onto the brush to insure that the particles of dust or other contaminants can be easily removed by the brush. The rotating brushes remove dust and other particles and sweep them into associated exhaust hoods from which they are evacuated by the exhaust air handling system. Some of the various positions to which the top brush 28 is moved as this body passes through the machine are shown diagrammatically in FIG. 2. When the top brush has completed movement along the path of travel determined by the selected profile, the processing unit causes the top brush assembly to return to its fully raised position by energizing its drive motor 36 and retracts the side brush assemblies by causing the pneumatic cylinders 22 to be actuated. This completes the cycle of the machine for this body and resets the processing unit to begin another cycle for processing the immediately succeeding vehicle body.

In the event the top brush assembly 12 is about to crash with a vehicle body, the body will break the beam of the collision detector photoelectric cell 84 which produces an input signal to the processing unit 142 which causes the brush assembly to be rapidly raised by deenergizing the clutch 36 so that the brush can rapidly swing up and away from the body.

Figure 5:
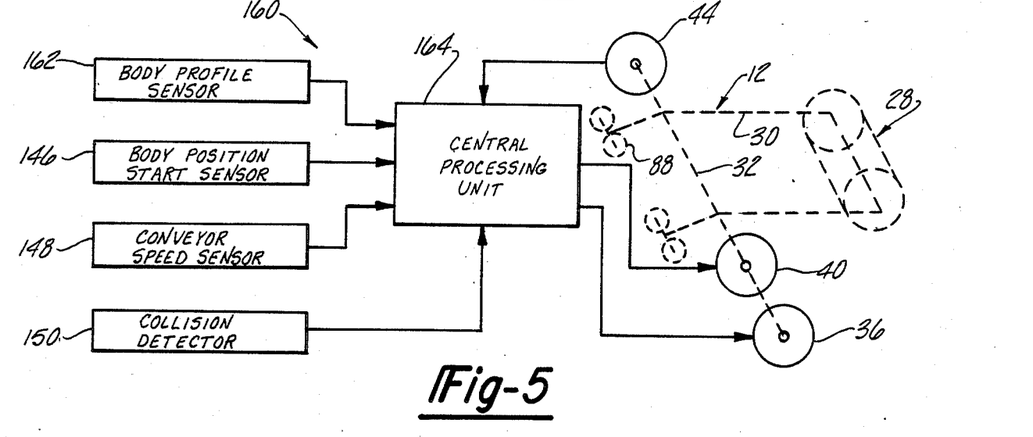
FIG. 5 is a block diagram of another control system for the machine of FIG. 1.

FIG. 5 illustrates a modified control system 160 for the machine 10 in which the shape or profile of each body is determined by a profile sensor 162 and then used to control movement of the top brush as such body passes through the machine. As the profile of each body is sensed, it is transmitted to and stored in a memory of a central processing unit 164. The central processing unit utilizes the stored profile to determine and control the path of travel of the brush assembly for its associated body in lieu of a predetermined and preprogrammed path of travel used by the control system 140. This eliminates the need to predetermine and preprogram a path of travel of the top brush for each vehicle body style to be cleaned by the machine. Thus, with control system 160, the machine can clean all different body styles or profiles without any predetermination and preprogramming of the path of travel of the top brush for each body style or profile. Hence, with this control system, the machine 10 is very versatile, easy to use, and does not require any skilled personnel to set up and preprogram the machine for each body style to be cleaned.

As shown in FIG. 2, the body profile sensor 162 has a scanner 166 disposed on one side of the machine 10 and a light source 168 disposed in generally opposed relation on the other side of the machine so that the vehicle body must pass between them as it approaches the brushes of the machine. The light source 168 can be a vertically disposed conventional florescent light tube 170. Preferably, light from the tube 170 is focused by a generally parabolic reflector 172 to increase its intensity and hence the contrast with the surrounding background. Preferably, the body profile sensor 162 is a line scan system commercially available from Saab-Scania Combitech AB of Jankoping, Sweden, as Model No. Saab EVS 300. This profile sensor will sweep a straight line or linear path of up to 60 inches in length, and divides the path into 1024 equal segments or locations each of which has an output or change of state responsive to the presence or absence of light from the light source. Through appropriate electronic circuitry, the uppermost transition from dark to light, or light to dark of each sweep of the scanner is sensed and stored in the memory of the central processing unit 164 to produce a profile of a vehicle body as it is moved between the scanner and the light source. In producing this profile, the central processing unit also utilizes an input from the conveyor speed sensor 148 to synchronize the signals from the scanner with the rate of movement of the body past the scanner.

The central processing unit 164 utilizes this profile in conjunction with an appropriate analog translating rotation of the drive shaft 32 of the brush assembly into the location of the rotary brush 28 to determine the movement of the brush assembly required to properly position the brush for engagement with the various panels of the body as the body passes through the machine. The central processor drives the motor 36 to move the top brush 28 to the proper position through an appropriate control circuit with a servo-loop which includes the position sensor 44. A suitable central processing unit 164 is commercially available from Saab-Scania Combitech AB as, Model No. PCC 963.

Control system 160 cycles and controls the movement of all of the brush assemblies and the cycling of the machine 10 in essentially the same manner as control system 140. Therefore, the function and operation of the machine 10 when cycled by control system 160 will be apparent to skilled persons and will not be described in further detail.

Figure 6:
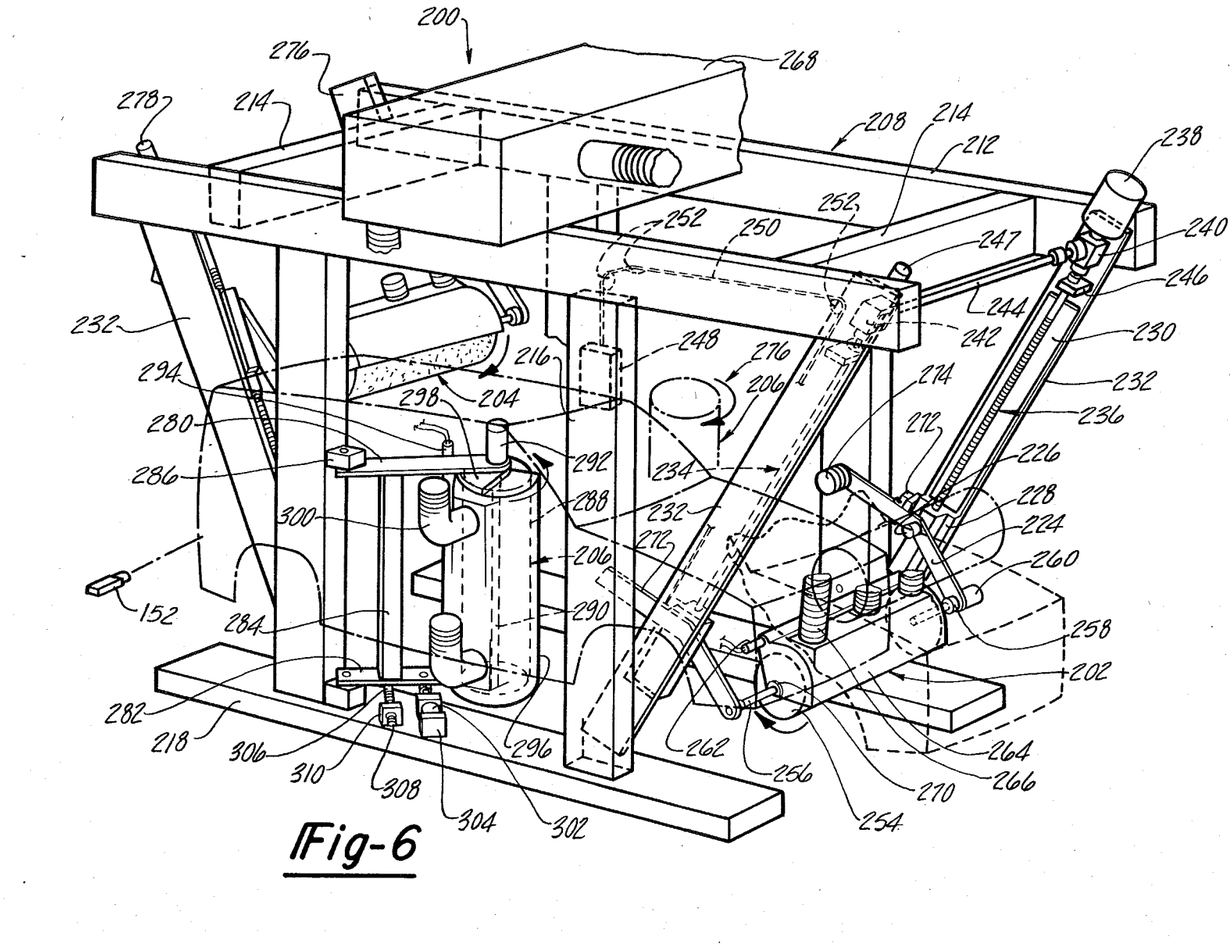
FIG. 6 is a perspective view of another tack-off machine embodying this invention and having two top rotary brushes.

FIG. 6 illustrates another tack-off machine 200 embodying this invention which has front and back top brush assemblies 202 and 204, and a pair of side brush assemblies 206 all carried by a frame 208. The frame has a pair of upper longitudinal rails 212 fixed to a pair of cross braces 214 and supported by hollow columns 216 fixed to base rails 218.

In accordance with a feature of this invention, to enable cleaning of the front, any hood and the roof of a vehicle body, the front top brush assembly 202 is constructed and arranged to pivot on an axis transverse to the direction of travel of the vehicle through the machine and be reciprocated along a path sloping upwardly and outwardly at an obtuse included angle to the path of travel of the vehicle through the machine. The front brush assembly 202 has a pair of carrier arms 222 and 224 each pivotally mounted on a bearing and retainer 226 secured to a slide 228 carried by a way and keeper 230 secured to a mounting plate 232 fixed to the frame. The slides are reciprocated in unison by a pair of ball screw drives 234 and 236 driven by a motor 238 coupled to the ball screws through gear boxes 240 and 242 and a coupling shaft 244. The ball screws are journalled in bearings 246 fixed to the mounting plates 232. An electric signal indicating the position of the slides on the ways is produced by a position sensor or encoder 247. Preferably, to minimize wear on the ball screws, the weight of the brush assembly 28 is counterbalanced by two counterweights 248 each received in one of the hollow columns 216 of the frame and connected to the slide by a wire cable 250 received on pulleys 252.

The front brush assembly has a rotary brush 254 fixed to a shaft 256 journalled in two bearings 258 secured to one end of the carrier arms and driven by a motor 260 coupled to the shaft and mounted on the arm 224. To neutralize any charge on the brush, a stream of ionized air is directed onto the brush by an ionizing bar 262 secured to and extending across the leading edge of an exhaust hood 264. Dust particles removed by the brush are evacuated and exhausted from the hood by an air stream produced by an exhaust fan (not shown) connected to the hood through flexible hoses 266 and a duct 268.

Preferably, the exhaust hood is permitted to rotate relative to the carrier arms by being journalled by bearings 270 on the drive shaft. However, if desired it can be secured to the arms. The mass of the brush and hood causes the carrier arms to rotate clockwise as viewed in FIG. 6. The extent of this clockwise rotation is limited by an adjustable stop 272 secured to each slide. When the brush assembly is removing dust from a panel of the vehicle, it is forced into engagement with the vehicle by the clockwise couple produced by its mass. Preferably, the amount of this clockwise couple is reduced and adjusted as desired by securing counterweights 274 to the other end of each carrier arm. However, to function properly, the mass of the counterweights is limited so that there will always be some couple tending to rotate the arms clockwise (as viewed in FIG. 5) to urge the brush into engagement with a body.

The rear top brush assembly 204 is essentially the same as the front assembly 202 except that it slopes upwardly and backwardly away from the direction of travel of a body through the machine at an acute included angle to the path of travel of the body approaching the machine. This inclination of the ways for the slides enables the rear brush assembly to contact and clean even a very long back panel of a vehicle which extends vertically or is even inclined backward at an acute included angle to path of travel of the vehicle such as an undercut rear window area of some passenger car bodies. The mechanism for moving the rear slides is driven by a motor 276. An electric signal indicating the position of the rear slides on their ways is produced by a position sensor or encoder 278.

The pair of side brush assemblies 206 are mirror images of each other. Each side brush assembly has a pair of upper and lower pivot arms 280 and 282 fixed to a support 284 and pivotally connected to mounting blocks 286 fixed to a support column 216 of the frame. A rotary brush 288 is fixed to a drive shaft 290 journalled by bearings secured to the other end of the arms and coupled to a drive motor 292 mounted on the upper arm. To facilitate removal of dust by the brush, a stream of ionized forced air is directed onto the brush by an ionizing bar 294 secured to and extending across the leading edge of an exhaust hood 296 adjustably secured to carrier plates 298 fixed to the arms. The exhaust hood is connected to the duct of the exhaust system by flexible hoses 300.

Each side brush assembly is advanced and retracted by a pneumatic cylinder 302 which has its piston rod pivotally connected to the lower arm 282 and its body pivotally connected to a mounting block 304 fixed to a base rail 218. The extent to which the side brush assembly can be retracted is limited by a stop 306 fixed to the lower arm which bears on an adjustable bumper 308 threaded in a mounting block 310 fixed to a base rail 218.

The exhaust hood, flexible hoses, brushes, actuating cylinders, adjustable stops, and pivotal mounting of the front, rear and side brush assemblies 202, 204, 276 and 278 of this tack-off machine 200 are essentially the same as the same components of the top and side brush assemblies of the tack-off machine 10.

Figure 7:
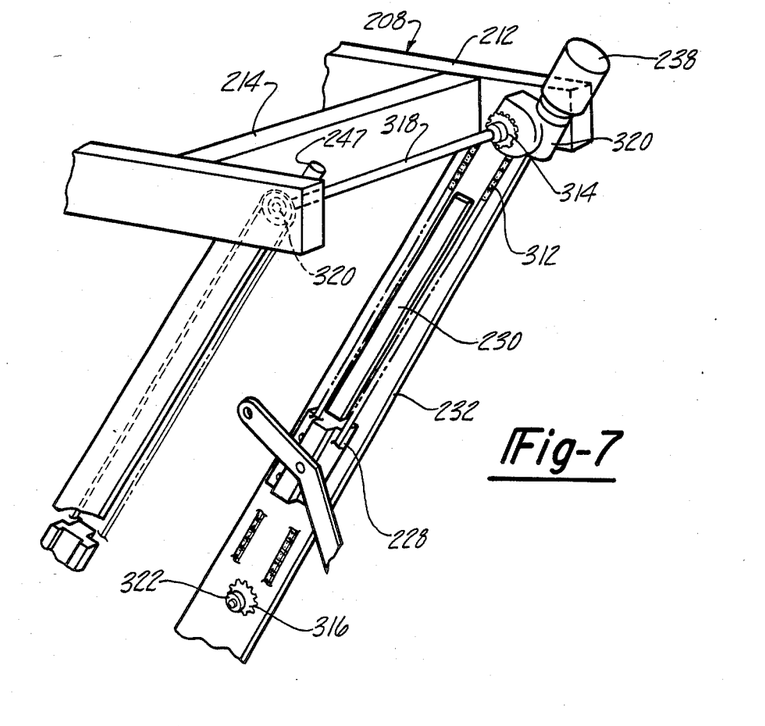
FIG. 7 is a fragmentary perspective view of a modified form of the drive mechanism for the top rotary brushes of the machine of FIG. 6.

FIG. 7 illustrates a modified drive mechanism for the slides 228 of the front and rear top brush assemblies. In lieu of the ball screw drives, the slides can be raised and lowered by chain and sprocket drive assemblies. For each slide, a loop of chain 312 is received over a drive sprocket 314 and an idler sprocket 316 and connected to the slide. Each drive sprocket is keyed to a drive shaft 318 which is driven by the motor 238 through a gear box 320. Each idler sprocket is journalled for rotation on a stub shaft 322 secured to the mounting plate 232.

The position of the brush assemblies on the ways 234 is indicated by the sensors or encoders 247 and 278.

So that the tack-off machine 200 can clean more than one style or shape of vehicle body, it is controlled by an automatic control system similar to either the body style sensor system 140 or the body shape sensor system 160 of the tack-off machine 10. Since the machine 200 has two top brush assemblies, the central processing unit of the control system produces one single to control the position and movement of the front top brush assembly 202, and another signal to control the position and movement of the back top brush assembly 204. Typically, each of these top brush assemblies contacts only some of the panels of a vehicle. Usually, the front top brush assembly 202 is positioned to contact and clean the front, any hood, and the roof of a vehicle body, and the back top brush assembly is positioned to contact and clean the roof, any rear deck, and the back of the vehicle body.

In operation of machine 200, the processing unit controls drive motor 238 through appropriate electropneumatic circuitry to move the front top brush assembly 202 up and down on its slide to cause its brush to sequentially engage the front, any hood, and preferably the roof of the body moving through the machine. The processing unit also controls the drive motor 276 of the rear top brush assembly 204 to move its brush to sequentially engage the roof, any rear window area, any rear deck and the back of a body passing through the machine. If desired, the rear brush can also be caused to contact any hood of the body. Some of the various positions assumed by the brushes of the front and rear top brush assemblies as a body passes through the machine are shown in FIG. 6. The function and operation of the control systems of the machine 200 is essentially the same as that of the control systems of the tack-off machine 10 except that it positions and controls two top brush assemblies and will be apparent to skilled persons and hence will not be described in detail.

It will also be apparent that in both of the tack-off machines, if desired, the position of the side brushes can also be varied and controlled to follow the contour of the sides of each vehicle body cleaned by the machine. With the control system 140, the path of travel of the side brushes so they will contact and follow the contour of the sides of each style of vehicle body to be cleaned, can be determined and preprogrammed into a memory of the central processing unit 142. When the detector system 144 sends a signal to the processing unit indicating a particular body style, the processing unit will also select from memory the appropriate path of travel for the side brushes. The processing unit through appropriate electropneumatic circuitry including a servo-loop with brush position sensors (not shown) will drive the pneumatic cylinders 122 to move the side brush assemblies so they will contact and clean the surfaces of the sides of the body as it passes through the machine. The movement of the side brushes in accordance with the selected path of travel is also synchronized by the central processing unit with the speed or rate of movement of the body through the machine by the conveyor in response to a signal from the conveyor speed sensor 148.

The control system 160 can be modified to also move the side brushes of the machines to follow the contour of the sides of each body cleaned by the machines. An additional pair of scanners and light sources can be used to produce a trace of each side of each body passing through the machine or because the sides of the vehicle body are mirror images, one scanner and light source can be used to produce a trace of one side and through appropriate electronic circuitry this trace can be used to control movement of both side brushes to clean both sides of the body. Each additional scanner and light source is located in generally opposed relation adjacent one side of the path of travel of the body so that only one side of the body passes between the scanner and the light source. The output of the side scanner is stored in a memory of the central processing unit 164. The central processing unit also utilizes an input from the conveyor speed sensor 148 to synchronize the signal from the side scanner with movement of the body past the scanner. The central processing unit 164 actuates and controls the pneumatic drive cylinders to move the side brushes to the proper position determined by the trace of one or both sides of the body through an appropriate electropneumatic control circuit with a servo-loop which includes a position sensor for one or both of the side brush assemblies. The central processor synchronizes this movement of the side brush assemblies with the rate at which the body is moved through the machine by the conveyor as indicated by a signal from the conveyor speed sensor 148.

Since this control circuitry for the side brushes of the machines is very similar to the control circuitry for the top brushes of the control systems 140 and 160, its construction, function and operation and will be apparent to skilled persons and will not be described in further detail.

I claim:

1. A tack-off machine for removing contaminant particles such as dust from surfaces of a series of vehicle bodies of at least two different styles moved along a path of travel through the machine by a conveyor means comprising:
   (a) a support,
   (b) at least one arm carried by said support,
   (c) a rotary brush carried by said arm with its axis of rotation extending generally horizontally and transverse to the path of travel of bodies through the machine,
   (d) a pivot member associated with said arm for pivoting said arm with respect to said support at a point spaced from said axis of said brush and upstream of said axis of said brush with respect to the direction of travel of bodies through the machine, said pivot member and arm being constructed and arranged to permit said brush to move in an arcuate path lying in a plane generally transverse to said axis of said brush and generally parallel to the path of travel of bodies through the machine,
   (e) drive means operatively associated with said arm and brush and constructed and arranged to move said axis of said brush generally along a path inclined at an obtuse included angle to the path of travel of bodies through the machine and sloping generally upwardly and forwardly in the direction of travel of bodies through the machine,
   (f) a brush position sensor which produces an electric signal indicating the position of said brush,
   (g) a body sensor upstream of said brush with respect to the direction of travel of bodies through the machine which produces an electric signal indicating one of the style or the profile of the vehicle body passing the body sensor,
   (h) a conveyor sensor which produces an electric signal indicating the speed at which a conveyor moves a vehicle body through the machine, and
   (i) an electronic central processing unit responsive to signals from said body sensor, conveyor sensor and brush position sensor to produce an output signal controlling said drive means to move said brush along its inclined path in synchronization with movement by the conveyor means of a body through the machine such that said brush is caused to contact some of the surfaces of such body for removing particulate contaminants from such surfaces.

2. The machine of claim 1 which also comprises, a body position sensor located upstream of said brush with respect to the direction of travel of bodies through the machine which produces an electric signal indicating the body has been advanced towards the brush to a predetermined location, and said central processing unit is responsive to a signal from said body position sensor to provide a reference from which said central processing unit initiates movement of said brush assembly along its inclined path.

3. The machine of claim 1 wherein when said brush contacts a surface of a body passing through the machine said pivot point for said arm is also located at a generally vertical height above the location at which such brush contacts such surface of such body.

4. The machine of claim 1 wherein said drive means comprises, a clutch and a reversible motor drivingly coupled with said arm through said clutch for turning said arm about said pivot to move said brush, and said clutch is constructed and arranged when engaged to provide a limited torque coupling with said motor.

5. The machine of claim 4 which also comprises a collision detector movable with said brush and constructed and arranged to provide an electric signal in response to an imminent collision between a body and said brush, and a control circuit connected with said collision detector and responsive to an electric signal from said collision detector to cause said drive motor to rapidly move said brush away from such body.

6. The machine of claim 5 wherein said clutch is an electrically actuated clutch which is disengaged in response to a signal from said collision detector.

7. The machine of claim 4 wherein said clutch is an electrically actuated clutch, and which also comprises a collision detector movable with said brush and constructed and arranged to provide an electric signal in response to an imminent collision between a body and said brush, and a control circuit responsive to a signal from said collision detector to disengage said electrically actuated clutch.

8. The machine of claim 1 which also comprises at least one slide received on a way carried by said support and constructed and arranged for movement along said way in a path inclined generally upward and in the direction of travel of bodies through the machine at an obtuse included angle to the path of travel of bodies through the machine, said pivot member being carried by said slide such that said arm can move with respect to said slide in said arcuate path about said pivot, and wherein said drive means is constructed and arranged to move said slide along said way.

9. The machine of claim 8 wherein said drive means comprises a ball and screw mechanism and a reversible drive motor coupled to said screw for rotating said screw to move said slide along said way.

10. The machine of claim 8 wherein said drive means comprises a loop of chain received over at least two spaced apart sprockets and connected to said slide, and a reversible drive motor coupled to at least one of said sprockets to rotate said sprocket for moving said slide along said way.

11. The machine of claim 8 wherein said brush position detector comprises, a sensor producing an electric signal indicating the position of said slide on said way.

12. The machine of claim 8 which also comprises, a second slide carried by a second way for movement along said way in a path sloping upwardly and rearwardly with respect to the direction of travel of bodies through the machine at an acute included angle with respect to the path of travel of bodies through the machine, a second arm carried by said second slide, a second rotary brush carried by said second arm and having its axis of rotation extending generally horizontally and generally transverse to the path of travel of bodies through the machine, said second arm being pivotally carried by said second slide at a point spaced from said axis of rotation of said second brush to permit pivotal movement of said second brush along a generally arcuate path which is generally transverse to and lies in a plane generally parallel to the path of travel of bodies through the machine, a second drive means constructed and arranged for moving said second slide along said second way, a second position sensor constructed and arranged to produce an electric signal indicating the position of said second slide on said second way, and said central processing unit being responsive to a signal from said second position sensor and said conveyor speed sensor to operate and control said second drive means to move said second slide along said second way to move said second brush in accordance with at least a portion of the profile corresponding to the body passing through the machine in synchronization with the speed which such body is moved through the machine by a conveyor to contact said second brush with at least a portion of a back surface of such body for removing particle contaminants from such surface.

13. The machine of claim 12 which also comprises, a pair of side brushes disposed on generally opposed sides of the path of travel of bodies through the machine and each constructed and arranged to be moved to an advanced position wherein the brush will contact at least a portion of a surface of a side of a body passing through the machine and to a retracted position wherein the brush is disengaged from and would not contact a body passing through the machine, an actuator associated with each side brush and constructed and arranged to move the side brush to said advanced and retracted positions, a body position detector located upstream of said brushes with respect to the direction of travel of bodies through the machine and constructed and arranged to produce an electric signal in response to advancement of a body toward the machine to a predetermined location and a control circuit responsive to an electric signal from said body position detector to energize said actuators to move said side brushes to their advanced positions.

14. The machine of claim 1 which also comprises an exhaust hood overlying and associated with said brush and an ionizing device constructed and arranged to produce a stream of ionized air directed onto said brush essentially throughout the axial portion of said brush which contacts a surface of the bodies.

15. The machine of claim 12 wherein said brush has a driven shaft for rotating said brush on its said axis and said exhaust hood is carried by and journalled on said shaft for relative rotation between said exhaust hood and said arm.

16. The machine of claim 1 wherein said body sensor detects the style of a vehicle body passing said body sensor and said central processing unit has a programmable memory capable of receiving at least two body profiles differing from each other, and said central processing unit is responsive to a signal from said body sensor to select the one body profile corresponding to the style of the vehicle body determined by said body sensor and utilizes such one body profile to determine and control movement of a brush to contact some of the surfaces of such body as such body is moved through the machine by the conveyor means.

17. The machine of claim 16 which also comprises a body position sensor located upstream of said brush with respect to the direction of travel of bodies through the machine which produces an electric signal indicating the body has been advanced towards the brush to a predetermined location, and said central processing unit is responsive to a signal from said body position sensor to provide a reference from which said central processing unit initiates movement of said brush assembly to contact the surface of the body being moved through the machine by the conveyor means.

18. The machine of claim 16 wherein said body sensor comprises a source of light and at least three photoelectric cells spaced from each other and each constructed and arranged to change state in response to a body interrupting a beam of light received by said photoelectric cells when such body passes by said photoelectric cells.

19. The machine of claim 1 wherein said body sensor comprises a light source and a scanner disposed generally in opposed relation such that when a body passes between them said scanner receives only a portion of the light from said light source, said scanner being constructed and arranged such that when a body passes said scanner and light source, said scanner produces an electric signal indicating the profile of such body, said central processing unit having a memory receiving and storing such signal from said scanner of a profile of such body, and said central processing unit utilizes such stored signal of the profile of such body in producing an output signal controlling said drive means to move said brush along its inclined path to contact some of the surfaces of such body.

20. The machine of claim 19 wherein said central processing unit also utilizes the conveyor sensor signal in producing such output signal controlling said drive means to move said brush to contact some of the surfaces of such body in synchronization with movement of such body by the conveyor means.

21. The machine of claim 19 wherein said scanner sweeps an elongate linear path and has an output signal responsive to substantial change in the intensity of light along said linear path.

22. The machine of claim 19 wherein said central processing unit also utilizes the signal from said conveyor sensor to synchronize the signal from said scanner with movement of such body by the conveyor means past said scanner so that the body profile signal stored in the memory of said central processing unit is also a function of the speed at which such body is moved by said scanner.

23. A tack-off machine for removing particle contaminants such as dust from at least a portion of each of a series of vehicle bodies comprising: a support, a top brush assembly having a pair of spaced apart pivot arms carried by said support, a rotary brush carried by said arms with its axis of rotation extending generally horizontally and generally transverse to the path of travel of bodies through the machine, said arms being pivoted to rotate in unison about an axis extending generally parallel to, spaced from, and lying generally upstream of said axis of rotation of said brush with respect to the direction of travel of bodies through the machine, said pivot axis also being located at a generally vertical height above the location at which such brush contacts a surface of a body passing through the machine, a reversible drive motor releasably coupled with said arms through a clutch constructed and arranged when engaged to couple said motor with said arms, a collision detector carried by at least one of said arms, movable with said brush, and constructed and arranged to provide an electric signal indicating an imminent collision between said brush and a body passing through the machine, and a control circuit connected with said collision detector and responsive to a signal from said collision detector to de-energize said clutch and thereby disengage said motor from said arms to permit said arms to rotate to rapidly move said brush away from such vehicle.

24. The machine of claim 23 which also comprises, counterweights carried by said arms and being of sufficient mass to cause said arms to rotate to move said brush away from such vehicle when said clutch disengages said motor.

25. The machine of claim 23 which also comprises, a body style detector producing an electric signal identifying a particular style of body to be moved through the machine by a conveyor, a conveyor speed sensor producing an electric signal indicating variations in the speed at which a conveyor moves a body through the machine, a brush position sensor producing an electric signal indicating the position of said brush on its arcuate path of travel, an electronic central processing unit with a programmable memory capable of storing at least two predetermined paths of travel for the brush differing from each other and each determined for one body style, and said central processing unit being responsive to a signal from said body style detector to select the one predetermined path of travel corresponding to the one body style detected by the style detector which will be moved through the machine by the conveyor and responsive to signals from the conveyor speed sensor and brush position sensor to operate and control the drive motor to move the brush along its arcuate path in accordance with the predetermined path of travel for such body in synchronization with the conveyor speed to cause said brush to contact at least some of the surfaces of such body as it passes through the machine for removing particle contaminants therefrom.

26. The machine of claim 23 which also comprises a body profile sensor producing an electric signal indicative of the profile of the body to be moved through the machine by a conveyor, a conveyor speed sensor producing an electric signal indicative of the speed at which the conveyor moves a body through the machine, a brush position sensor producing an electric signal indicative of the position of said brush on its arcuate path of travel, an electronic central processing unit with a memory capable of storing a body profile determined by the body shape sensor and responsive to the stored body profile and a signal from the conveyor speed sensor to operate and control the drive motor to move the brush along its arcuate path in accordance with the profile for such body in synchronization with the conveyor speed to cause said brush to contact at least some of the surfaces of such body as it passes through the machine for removing particle contaminants therefrom.

27. The machine of claim 1 wherein said rotary brush comprises a plurality of hubs constructed and arranged to be received on a common shaft with adjacent side faces in generally opposed face-to-face relationship, coupling means carried by each hub and constructed and arranged to drivingly connect together adjacent hubs when in such face-to-face relationship so they rotate in unison and a plurality of bristles carried by and secured to each hub in circumferentially spaced apart relationship around such hub.

28. The machine of claim 27 wherein said rotary brush coupling means comprises a pin carried by each hub which projects from a side face of such hub and is received in a recess in an adjacent hub when they are in such face-to-face relationship.

* * * * *